United States Patent Office
3,365,521
Patented Jan. 23, 1968

3,365,521
PROCESS FOR PRODUCING SUBSTANTIALLY ALKALI-FREE KILN OUTPUT WHEN BURNING MINERALS CONTAINING DIFFICULT-TO-VOLATILIZE ALKALI
Kunibert Brachthauser, Cologne-Poll, Germany, assignor to Klockner-Humboldt-Deutz Aktiengesellschaft, Cologne-Deutz, Germany, a corporation of Germany
Filed June 18, 1965, Ser. No. 465,062
Claims priority, application Germany, June 19, 1964, K 53,256
7 Claims. (Cl. 263—53)

ABSTRACT OF THE DISCLOSURE

Method of producing substantially alkali-free output from a kiln wherein material containing difficult-to-volatilize alkali is burned includes steps of passing the kiln output through a cooler traversed by air, vaporizing water in the cooler, passing to the kiln at least a portion of the air heated by heat exchange with the kiln output and the vaporized water in the cooler and entraining the vaporized water, and reacting the air-borne vaporized water with the difficult-to-volatilize alkali contained in the material in the kiln in sufficient quantity for forming relatively easily volatilizable hydroxide of substantially all of the difficult-to-volatilize alkali in the material. The method may also include branching off a portion of the discharging waste gas, mixing it with coolant air to reduce the temperature thereof, and separating alkali-laden dust contained in the branching portion of the waste gas from the coolant air-waste gas mixture. The remaining portion of the discharging waste gas is used for preheating by heat exchange the material supplied to the kiln.

Figure 1:
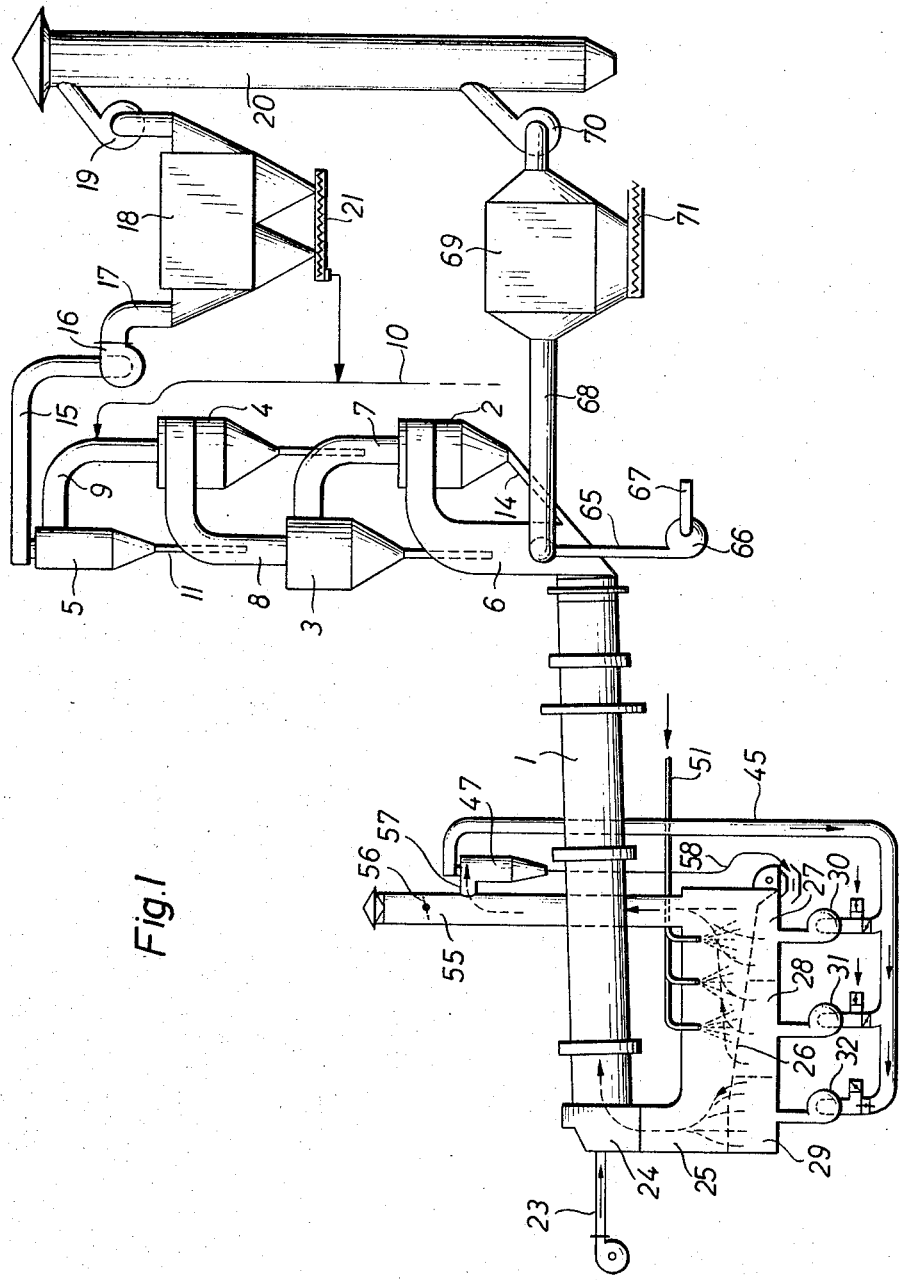

My invention relates to process for producing substantially alkali-free kiln output when burning or firing minerals containing difficult-to-volatilize alkali.

Many minerals contain alkali compounds which volatilize only at very high temperatures and are consequently often not expelled during the burning or firing process. It is, however, of great importance during the calcination or firing of cement raw material, for example, that the alkali content of the kiln output should not exceed a specific percentage.

When calcining cement raw material, it is well known that by the addition of $CaCl_2$ or $CaF_2$ for example to cement raw material, the volatility of the alkalies contained therein can be increased. However, the addition of such reagents increases the cost of the calcining process very greatly.

It is furthermore known that alkali compounds such as $K_2O$ or $K_2SO_4$ which are difficult to volatilize can be converted to more easily volatilizable alkali hydroxides by causing water vapor to react therewith. However, no use has evidently been made of such a step heretofore when firing or burning minerals possessing alkalies that are difficult to volatilize, because of the fear that the additional heat expenditure necessary for producing the required water vapor would be too high and consequently uneconomical.

It is accordingly an object of my invention to provide a process of burning minerals containing alkalies that are difficult to volatilize so as to produce a kiln output that is substantially alkali-free and which is marked by very economical heating.

It is another object of my invention to provide such a process which does not require complicated apparatus for the performance thereof.

It is a further object of my invention to provide such a process wherein the required quantity of cooling air can be sharply reduced so that there is a consequent reduction in the consumption of electrical energy for blowers employed to produce the flow of cooling air.

In accordance with yet another object of my invention I provide a process in which air is directed at such a velocity upwardly through the spacing in a grating or screen supporting the mineral material that there is a reduction in the amount of material normally falling through the grating.

With the foregoing and other objects in view, I provide a process for producing a substantially alkali-free kiln output when burning minerals containing alkalies difficult to volatilize, which comprises passing the material delivered from the kiln through a cooler traversed by air, passing at least a portion of the heated cooling air to the kiln so that water in the cooler is vaporized in such quantity that the water vapor carried or conveyed with the heated cooling air into the kiln reacts with the alkalies difficult to volatilize that are contained in the raw material of the kiln and convert the same into alkali hydroxides that are easily volatilizable. Thus not only the alkali compounds that are easily volatilizable but also the alkalies which are naturally difficult to volatilize and which are contained in the material are vaporized or volatilized in the kiln and are exhausted with the waste gas of the kiln.

In accordance with another feature of my invention, I provide a process which comprises passing the fresh cooling air through the material discharged from the kiln which is located in the last portion of the cooling device when viewed in the direction of flow of the material, introducing the water in the last portion of the cooling device above the material and conducting the entire or substantially the entire amount of the thus-moistened air through the material located in the first portion of the cooling device and finally guiding it into the kiln.

For kiln installations wherein the sensible heat contained in the kiln discharge gases is to be utilized in direct heat exchange for preheating the raw material, there arises a problem in that the alkalies contained in the kiln waste gas deposit on the raw materials in the temperature range of about 600 to 1000° C. and are reconveyed with the raw material into the kiln. In order to prevent the kiln waste gases from being thereby increasingly enriched or loaded with alkalies, in accordance with a further feature of my invention I provide my process with a step which comprises continuously exhausting into the open air a portion of the flow of the waste gas discharging from the kiln before reaching the heating device.

Other features which are considered as characteristic for the invention are set forth in the appended claims.

Although the invention is illustrated and described herein as process for producing substantially alkali-free kiln output when burning minerals containing difficult-to-volatilize alkali, it is nevertheless not intended to be limited to the details shown since various modifications may be made therein without departing from the spirit of the present invention and within the scope and range of equivalents of the claims.

Figure 2:
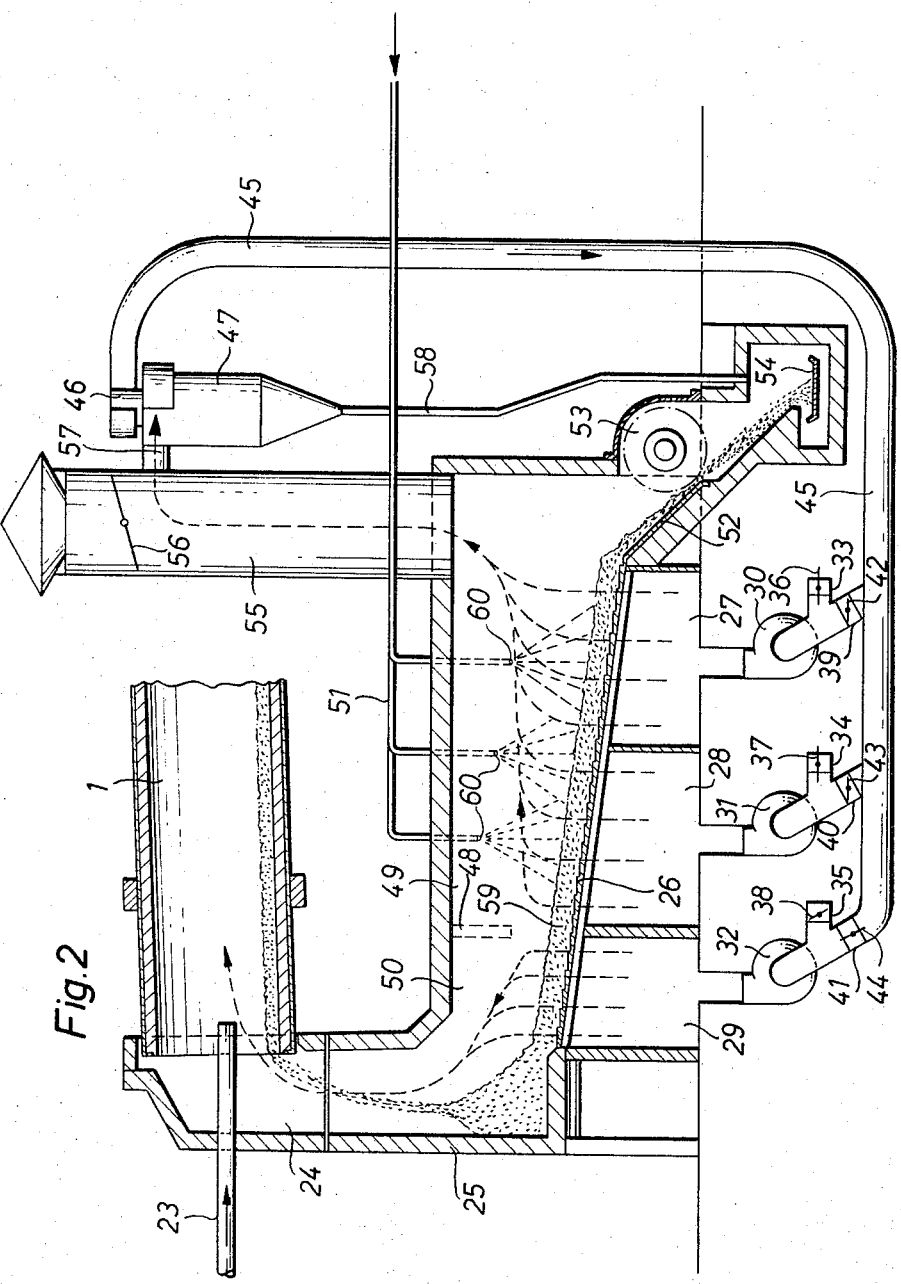

The invention, together with additional objects and advantages thereof, will be best understood from the following description when read in connection with the accompanying drawings, in which:

FIG. 1 is a diagrammatic view of the kiln installation for carrying out the process of my invention; and FIG. 2 is an enlarged diagrammatic view of the cooling apparatus shown at the left hand side of FIG. 1.

Referring now to the drawings and first in particular to FIG. 1, there is shown a preheating plant or apparatus for the material to be processed which is serially connected with the rotary kiln 1. The preheating apparatus comprises four interconnecting cyclones 2–5 arranged in tandem. A portion of the waste gas flow of the rotary kiln 1 passes successively through a tubular conduit 6 into cyclone 2, through a conduit 7 into cyclone 3, through a conduit 8 into cyclone 4 and through a conduit 9 into cyclone 5. The material to be processed, for example cement raw material containing alkalies that are difficult to vaporize, is introduced into the conduit 9 leading to the cyclone 5 by means of a pneumatic conveyor system 10 or by any other suitable conveying means, for example a bucket elevator, and the raw material is carried into the cyclone 5 by the gases which pass through the cyclone 5. The cement raw material that deposits in the cyclone 5 passes through the dust discharge tube 11 into the gas conduit 8 and out of the latter into the cyclone 4. In a similar manner, the cement raw material passes through the cyclones 3 and 2, successively, and is delivered from the latter through the dust discharge tube 14 to the kiln 1. The cement raw material thus comes into contact with increasingly hotter kiln waste gases on its path through the heating apparatus, whereby good heat exchange takes place between the portion of the gas flow, which enters the preheating apparatus with a temperature of about 1000 to 1200° C., and the cement raw material. The temperature of the gas thereby decreases to only 250 to 350° C. by the time it passes through the cyclone 5 whereas the temperature of the raw material simultaneously increases to about 800° C. after passing through the cyclone 2.

The waste gases guided through the preheater discharge through the gas conduit 15. Suction is applied thereto by the blower 16 and they are subsequently delivered to an electrostatic dust separator 18 through a conduit 17. A blower 19 then draws the cleaned gas from the separator 18 into a chimney 20 from which it is vented into the surrounding free air. The dust separated in the dust separator 18 is accumulated in a screw conveyor 21 and in a suitable manner, for example by means of slides or air conveyors is advanced to the conveying device 10 and is again supplied together with fresh cement raw material into the conduit 9 of the heat exchanging or preheating plant.

The preheated raw material entering the rotary kiln 1 through the dust discharge tube or conduit 14 passes in a direction toward the left-hand side of FIG. 1 through the rotary kiln and is thereby burned to clinker through the counterflowing heating gases the flame produced by a kiln firing or burning mechanism 23 of conventional construction. The clinker or kiln output is transported to the kiln head 24 and passes into a cooling apparatus 25.

As shown in greater detail in FIG. 2, the cooling apparatus 25 is in the form of a grating cooler with a declining step grating 26. Beneath the grill or grating 26, three chambers 27, 28 and 29 are located, each of which is connected with the pressure side of respective blowers 30, 31 and 32. The suction side of the blowers 30, 31 and 32 are provided with connecting tubes 33, 34 and 35 respectively for sucking air out of the atmosphere, a throttle or butterfly valve 36, 37, 38 respectively being provided in the tubes 33, 34 and 35 for controlling the amount of air being sucked in. Beneath the suction tubes 33, 34, 35, the suction side of each blower is connected through a respective junction member 39, 40, 41, each provided with a respective throttle valve 42, 43, 44, with a common conduit or manifold 45 which is in turn connected to the clean gas outlet 46 of a cyclone 47.

The space above the step grating 26 is advantageously divided by a partition 48 into two compartments 49 and 50. A plurality of spray nozzles 60 are provided in the compartment 49 and distributed across the entire width of the step grating 26. The spray nozzles 60 are connected to a water supply conduit 51. The step grating 26 extends to a slide 52 at the right end thereof as shown in FIG. 2 and a clinker crusher of conventional construction is advantageously provided above the slide 52. By means of the crusher 53, the clinkers sliding down the slide 52 are comminuted. The crushed material then descends to a conveyor 54 and is conveyed thereby to other locations for subsequent processing. At the right side end of the compartment 49, as shown in FIG. 2, a chimney 55 is connected from above and is provided with a built-in throttle valve 56. The chimney is further provided with a branching tube 57 beneath the throttle valve 56, and the branching tube 57 in turn is tangentially connected with a cyclone 47.

During operation, the throttle valves or dampers 36, 37, 44 are opened and the throttle valves or dampers 38, 42, 43 are closed. By the action of the blowers 30 and 31, air from the atmosphere is blown into the chambers 27, 28. This air passes through the apertures of the stepped grating or screen 26 and flows subsequently through the clinker layer 59. The clinkers are thereby effectively cooled and the cooling air is consequently heated. Simultaneously, water is supplied into the compartment 49 by the spray nozzles 60 and is sprayed on the clinker layer 59 located in the compartment 49. Due to the high temperature present in the compartment 49 and possessed by the clinkers, rapid vaporization of the water takes place whereby the temperature of the heated cooling air is simultaneously lowered. The water vapor mixes with the cooling air and is drawn therewith into the chimney 55. The throttle valve 56 is so adjusted within the chimney 55 that all or most of the cooling air laden water vapor is drawn through the tube 57 into the cyclone 47. The clinker dust located in the vapor-air mixture in the cyclone 47 is deposited and discharge through the dust discharge tube 58 onto the conveyor 54.

The thus cleansed air laden with water vapor is drawn out of the cyclone 47 through the conduit 45 and is blown by the blower 32 into the chamber 29. It is then drawn by the action of the blower 16 (FIG. 1) through the beginning portion of the step grating, i.e. on the left hand side of FIG. 2, and the clinker layer lying thereon. Thus the vapor-air mixture is heated to a temperature of for example 700 to 800° C. while the fresh and consequently hottest clinkers are simultaneously cooled. This hot vapor-air mixture then passes out of the compartment 50 as secondary air through the kiln head 24 and into the kiln 1 (FIG. 2).

During its passage through the kiln, the cement raw material and the clinkers formed therefrom are subjected to the action of the water vapor supplied into the kiln with the secondary air. The water vapor reacts with the alkalies difficult to vaporize that are contained in the material in the kiln, for example $K_2O$ or $K_2SO_4$, and converts these into alkali hydroxides that are more easily vaporizable. Consequently, during the burning process in the kiln, not only the more easily vaporizable alkalies that are contained in the cement raw material are vaporized and eliminated from the kiln gas, but also all or most of those alkalies which would normally remain entirely in the material in the kiln if not converted by the water vapor to alkali hydroxides, as aforementioned. By means of the water vapor for instance alkalies difficult to vaporize that are supplied with the firing fuel into the kiln are converted into alkali hydroxides that are easily vaporizable so that no alkalies from the fuel can also contaminate the clinker. In this manner, assurance is provided that the clinker produced in the kiln does not possess any alkalies or at most possesses only a very small percentage of alkalies.

If, as in the embodiment of the installation for carrying out the process of this invention, an apparatus is serially connected to the rotary kiln for preheating the cement raw material by direct heat exchange with the kiln waste gas, the problem arises that the alkalies carried with the kiln waste gas into the preheating apparatus deposit on the cement raw material and are returned therewith through the circuit into the kiln. Without special precautions, therefore, the kiln waste gas is then continuously enriched with alkalies and the cement raw material in the preheater is accordingly laden with alkalies in ever-increasing amounts. Consequently, with the passage of time, the fluidity of the cement raw material can become so greatly impaired that formation of encrustations and obstructions in the preheater can take place. Furthermore, whenever the alkali content of the kiln atmosphere is too high, undesirably large quantities of alkali can remain in the processed material in the kiln. In order to prevent the cement raw material on the one hand and the kiln atmosphere on the other hand from being too greatly enriched with alkalies traversing the circuit, I provide in accordance with my invention that a portion of the flow of gases discharging from the kiln is branched off continuously before reaching the heating apparatus. For this purpose, a conduit 68 is connected to the waste gas conduit 6 (FIG. 1) and leads to an electrostatic dust separator 69. A tube 65 is tangentially connected with the conduit 68 near the junction thereof with the waste gas conduit 6. Tube 65 is connected with the pressure side of a blower 66 which sucks in air from the atmosphere through the tube 67. By the action of a blower 70 located behind the dust separator 69, a portion of the flow of the gas discharging from the kiln and laden with water vapor is continuously sucked into the conduit 68 and is passed into the dust separator together with the air delivered by the blower 66. The air thereby serves as cooling air and the quantity of air supplied to the conduit 68 is advantageously adjusted by means of a regulating device of conventional construction (not shown) so that the dust separator 69 is not endangered by a gas temperature that is too high. The cleansed gas-air mixture discharging from the separator 69 through the blower 70 is vented subsequently through the chimney 20 into the free atmosphere. The dust loaded with alkalies and deposited in the separator 69 accumulates in a screw conveyor 71 and is removed thereby from the system.

The ratio of the gas flow portion branched off by the tubular conduit 68 to the gas flow portion passing directly into the preheater is adjusted so that on the one hand the alkali quantities passed with the gas flow portion into the preheater remain below the danger limit at which the cement raw material would be baked onto the walls of the preheater due to the alkalies deposited thereon, and on the other hand the alkali content of the kiln atmosphere does not exceed a predetermined percentage due to the alkalies passing through the circuit. The correct ratio of both gases to one another can easily be determined by experimentation. Generally it should be sufficient to branch off through the tubular conduit 68 about 10% of the water-vapor-laden gas discharging from the kiln before it enters the preheating system.

To prevent the formation of encrustation and obstructions in the preheater as well as an excessively high alkali content of the kiln atmosphere and of the clinker that is produced therewith, it is not absolutely necessary that a portion of the gas flow issuing from the kiln in accordance with my invention be conducted away into the free atmosphere. Such undesirable alkali can often also be removed in another suitable manner for example by conducting the entire kiln waste gas or a portion of this gas flow through a vessel before admitting it to the preheater and bringing it in contact with a fine-grain solid material continuously traversing the vessel for the purpose of depositing in the granular material the alkali vapors entrained by the gas. The alkali content of the kiln waste gas can thus be also removed or at least so greatly reduced that the aforementioned encrustations and obstructions during operation of the preheater will no longer occur, and clinker will be formed that possesses no alkali content or at most only a very small alkali content.

The quantity of water which is vaporized in the cooler in accordance with my invention depends upon the nature and the quantity of the alkalies that are difficult to volatilize which are contained in the material in the kiln, and can be determined very easily by simple, known experimental techniques. As aforementioned, when water is introduced into the heated compartment 49 and onto the hot clinker bed located therein, rapid vaporization thereof occurs. Consequently it is not necessary to atomize the water very finely but rather merely sufficient, as aforedescribed, to permit the water to discharge from simple shower heads 60. Since the vaporization of the water takes place, furthermore, with the heat which would normally have been lost through the air-venting chimney 55 of the cooling apparatus, no heat losses arise due to the vaporizing. On the other hand, the water vapor introduced with the secondary air into the kiln, as aforementioned, has a temperature of about 700 to 800° C. This heat content is utilizable extensively in the heating apparatus for preheating the cement raw material. Naturally, during operation of the aforedescribed apparatus, care must be taken that the temperature of both gas flows until their discharge from the separators 18 and 69 or from the chimney 20 does not drop below the dew point.

With my invention considered as a whole, the heat balance is not impaired by the water vaporization. On the contrary, the method of my invention permits the kiln waste gases to be enriched with water vapor without requiring additional heat and without complicated apparatuses as for example spraying nozzles, so that the alkalies vaporizable with difficulty which are contained in the processing material and in the combustion fuel, as the case may be, are changed into easily vaporizable alkali hydroxides. A substantially alkali-free kiln output is accordingly obtained.

An additional advantage of my invention is that the quantity of cooling air to be brought into the last part of the cooler, that is through the chambers 28, 27, can be less than without water addition, because part of the clinker heat is employed for water vaporization. The quantity of air necessary for cooling can therefore be greatly reduced so that it corresponds to the necessary quantity of secondary air for the rotary kiln. Consequently, it is necessary for the blowers 30 and 31 to draw in only a correspondingly small coolant air quantity so that a saving of electrical energy for these blowers is effected. Moreover, with such a manner of operation, the throttle valve 56 in the chimney 55 can be entirely closed so that no coolant exhaust air and no clinker dust therewith are exhausted through the chimney into the free atmosphere.

In addition to the air from the atmosphere which is drawn in through the tubes 33 and 34, the chambers 27 and 28 can also be supplied with warm return air from the conduit 45 by opening the throttle valves 42 and 43. The thermal content of this return air improves the vaporization of the water sprayed into the chamber 49. Moreover, by introducing return air into the chambers 27 and 28, the velocity of the air flowing upwardly through the apertures of the grating 26 is increased, thereby reducing the quantity of material falling through the apertures of the grating. On the other hand, it is also possible, by opening the throttle valve 38, to supply the chamber 29 with fresh air from the atmosphere in addition to return air from the conduit 45.

It is not necessary in all cases that each of the chambers 27, 28 be provided with a particular blower 30, 31, respectively, but rather, both chambers can be connected with a common blower of suitably increased dimensions. Furthermore, it is possible to provide a single chamber instead of the two chambers 27, 28.

The invention can be employed not only for kilns with grating or screen coolers but rather also for kilns with air cooling devices of other suitable construction. Furthermore, the preheating apparatus connected in advance of the rotary kiln need not necessarily have the construction of a cyclone system which is shown and described herein as a preferred embodiment of the apparatus for carrying out the process of this invention. My invention is, on the contrary, independent of the type of preheater connected to the rotary kiln. Furthermore, the invention of this application can be employed advantageously even where no preheater at all is provided.

My invention is moreover not limited to the calcining of cement raw material or similar ceramic materials but rather can be employed in substantially all cases where chemical reactions of materials containing alkalies that are vaporizable with difficulty are carried out at temperatures above substantially 1000° C.

The dust laden with alkalies that is deposited in the separator 69 can for example be conveyed to an apparatus in which the alkalies can be separated in pure form by leaching out or extracting with water. When burning or calcining cement raw material or the like, the dust laden with alkalies, which is discharged from the separator 69, can also be used as fertilizer.

I claim:

1. Method of producing substantially alkali-free output from a kiln wherein material containing difficult-to-volatilize alkali is burned, which comprises passing the kiln output through a cooler traversed by air, vaporizing water in the cooler, passing to the kiln at least a portion of the air heated by heat exchange with the kiln output and the vaporized water in the cooler and entraining the vaporized water, and reacting the air-borne vaporized water with the difficult-to-volatilize alkali contained in the material in the kiln in sufficient quantity for forming relatively easily volatilizable hydroxide of substantially all of the difficult-to-volatilize alkali in the material.

2. Method of producing substantially alkali-free output from a kiln wherein material containing difficult-to-volatilize alkali is burned, which comprises passing the kiln output along a path through a cooler, vaporizing water over the kiln output on the leading portion of the path in the cooler, passing ambient air through the kiln output on the leading portion of the path in the cooler so that it is simultaneously moistened by the vaporized water and heated by heat exchange with the kiln output and the vaporized water, passing substantially all of the moistened air to the kiln through the kiln output on the trailing portion of the path in the cooler so that it is further heated by heat exchange with the kiln output, and reacting the vaporized water in the moistened air with the difficult-to-volatilize alkali contained in the material in the kiln in sufficient quantity for forming relatively easily volatilizable hydroxide of the substantially all of the difficult-to-volatilze alkali in the material.

3. Method of producing substantially alkali-free output from a kiln wherein material containing difficult-to-volatilize alkali is burned, which comprises passing the kiln output along a path through a cooler, vaporizing water over the kiln output on the leading portion of the path in the cooler, passing coolant air in a quantity substantially corresponding to a quantity of secondary air required for the kiln through the kiln output on the leading portion of the path in the cooler so that it is simultaneously moistened by the vaporized water and heated by heat exchange with the kiln output and the vaporized water, passing substantially all of the moistened coolant air to the kiln through the kiln output on the trailing portion of the path in the cooler so that it is further heated by heat exchange with the kiln output, and reacting the vaporized water in the moistened coolant air with the difficult-to-volatilize alkali contained in the material in the kiln in sufficient quantity for forming relatively easily volatilizable hydroxide of the substantially all of the difficult-to-volatilize alkali in the material.

4. Method of producing substantially alkali-free output from a kiln wherein material containing difficult-to-volatilize alkali is burned, which comprises passing the kiln output along a path through a cooler, vaporizing water over the kiln output on the leading portion of the path in the cooler, passing ambient air through the kiln output on the leading portion of the path in the cooler so that it is simultaneously moistened by the vaporized water and heated by heat exchange with the kiln output and the vaporized water, recycling a portion of the moistened air through the kiln output on the leading portion of the path in the cooler and commingling it with the amibent air passing therethrough, passing substantially all of the remainder of the moistened air to the kiln through the kiln output on the trailing portion of the path in the cooler so that it is further heated by heat exchange with the kiln output, and reacting the vaporized water in the moistened air with the difficult-to-volatilize alkali contained in the material in the kiln in sufficient quantity for forming relatively easily volatilizable hydroxide of the substantially all of the difficult-to-volatilize alkali in the material.

5. Method of producing substantially alkali-free output from a kiln wherein material containing difficult-to-volatilize alkali is burned which comprises passing the kiln output along a path through a cooler, spraying water through spray nozzles over the kiln output on the leading portion of the path in the cooler, vaporizing the water, simultaneously heating a supply of air passing through the kiln output on the leading portion of the path in the cooler by heat exchange with the kiln output and the vaporized water and moistening the supply of air with the quantity of vaporized water, passing substantially all of the moistened air to the kiln through the kiln output on the trailing portion of the path in the cooler so that it is further heated by heat exchange with the kiln output, and reacting the vaporized water in the moistened air with the difficult-to-volatilize alkali contained in the material in the kiln in sufficient quantity for forming relatively easily volatilizable hydroxide of the substantially all of the difficult-to-volatilize alkali in the material.

6. Method of producing substantially alkali-free output from a kiln wherein material containing difficult-to-volatilize alkali is burned, which comprises supplying the material into the kiln for burning therein, discharging waste gas from the kiln and passing the kiln output through a cooler traversed by air, vaporizing water in the cooler, passing to the kiln at least a portion of the air heated by heat exchange with the kiln output and the vaporized water in the cooler and entraining the vaporized water, reacting the air-borne vaporized water with the difficult-to-volatilize alkali contained in the material in the kiln in sufficient quantity for forming relatively easily volatilizable hydroxide of the substantially all of the difficult-to-volatilize alkali in the material dischargeable with the waste gas as the material is burned in the kiln, branching off a portion of the discharging waste gas, and preheating the material supplied to the kiln by heat exchange with the remaining portion of the discharge waste gas.

7. Method according to claim 6, including mixing coolant air with the branching portion of the discharging waste gas so as to reduce the temperature thereof, and separating alkali-laden dust contained in the branching portion of the waste gas from coolant air-waste gas mixture.

References Cited

UNITED STATES PATENTS

| | | | |
|---|---|---|---|
| 2,687,290 | 8/1954 | Garoutte et al. | 263—53 |
| 3,162,431 | 12/1964 | Muller et al. | 263—32 |
| 3,212,764 | 10/1965 | Muller et al. | 263—32 |
| 3,288,450 | 11/1966 | Bade | 263—32 |

FREDERICK L. MATTESON, Jr., *Primary Examiner.*

JOHN J. CAMBY, *Examiner.*